US007661147B2

(12) United States Patent
Pastorelli et al.

(10) Patent No.: US 7,661,147 B2
(45) Date of Patent: *Feb. 9, 2010

(54) SYSTEM FOR CONTROLLING USE OF DIGITALLY ENCODED PRODUCTS

(75) Inventors: Bernardo Pastorelli, L'Aguila (IT);
Domenico Di Giulio, Rome (IT);
Riccardo Rossi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 189 days.

This patent is subject to a terminal disclaimer.

(21) Appl. No.: 12/018,232

(22) Filed: Jan. 23, 2008

(65) Prior Publication Data

US 2008/0189795 A1    Aug. 7, 2008

Related U.S. Application Data

(63) Continuation of application No. 10/476,945, filed on Nov. 5, 2003, now Pat. No. 7,376,971.

(30) Foreign Application Priority Data

Oct. 30, 2001    (EP)    ................... 01480108

(51) Int. Cl.
*H04L 9/00*    (2006.01)
(52) U.S. Cl. .......................................... 726/27; 705/59
(58) Field of Classification Search ................. None
See application file for complete search history.

(56) References Cited

U.S. PATENT DOCUMENTS 5,671,412 A    9/1997    Christiano 5,673,315 A    9/1997    Wolf (Continued)

FOREIGN PATENT DOCUMENTS

EP    0852349 A2    12/1997

(Continued)

OTHER PUBLICATIONS

Fields, "License Manager Design Document", Apr. 1992, pp. 1-21, Massachusetts Institute of Technology. http://stuff.mit.edu/afs/athena/system/slw/attic/doc/lm.doc.

(Continued)

*Primary Examiner*—Minh Dinh
(74) *Attorney, Agent, or Firm*—Yee & Associates, P.C.; Jeffrey S. LaBaw

(57) ABSTRACT

A method (300) and system for controlling use of software programs on multiple workstations of a network. An agent running on each workstation detects (306) any new process (using a kernel hooking technique), which is started in response to the request of execution of a program (397). The process is suspended (308) and an authorization to run the program is requested (334) to an associated metering server. The metering server compares (380) the current usage of the product with the respective authorized conditions of use, and answers (382) the agent granting or denying the authorization to run. The process is accordingly resumed (312), in order to enable the program to start, or aborted (315), so as to prevent execution of the program. In any case, the program is not stopped (but it is prevented from starting); this avoids killing the program while it is performing potentially risky operations.

2 Claims, 5 Drawing Sheets

U.S. PATENT DOCUMENTS

| | | |
|---|---|---|
| 5,758,069 A | 5/1998 | Olsen |
| 5,790,664 A | 8/1998 | Coley et al. |
| 5,974,549 A | 10/1999 | Goland |
| 6,021,438 A | 2/2000 | Duvvoori et al. |
| 6,411,941 B1 | 6/2002 | Mullor et al. |
| 6,574,612 B1 | 6/2003 | Baratti et al. |
| 7,120,429 B2 | 10/2006 | Minear et al. |
| 7,536,356 B2 * | 5/2009 | Eng .......................... 705/59 |

FOREIGN PATENT DOCUMENTS

| | | |
|---|---|---|
| JP | 06-223040 | 8/1994 |
| JP | 09-237189 | 9/1997 |
| JP | 10-171649 | 6/1998 |
| JP | 2000-057035 | 2/2000 |
| JP | 2000-305776 | 11/2000 |
| JP | 2001-142689 | 5/2001 |
| JP | 2001-222424 | 8/2001 |
| JP | 2001-236219 | 8/2001 |

OTHER PUBLICATIONS

Hauser, "Does Licensing Require New Access Control Techniques", Communications of the ACM, Nov. 1994, pp. 48-55, vol. 37 No. 11, ACM. http://portal.acm.org/citation.cfm?id=188295.

"System Management Software License Use Management (XSLM)", The Open Group, Mar. 1999, pp. 1-24. http://www.opengroup.org/onlinepubs/009619399/toc.pdf.

Olsen et al., "Concurrent Access Licensing", Usenix, Jun. 1988, pp. 287-294, San Francisco.

"Security, License, Management and Application Metering Process for Controlling Applications in the DOS Environment", IBM Technical Disclosure Bulletin, Nov. 1994, pp. 195-199, vol. 37 No. 11, NY.

* cited by examiner

SYSTEM FOR CONTROLLING USE OF DIGITALLY ENCODED PRODUCTS

This application is a continuation of application Ser. No. 10/476,945, filed Nov. 5, 2003 now U.S. Pat. No. 7,376,971, status, allowed.

BACKGROUND OF THE INVENTION

The present invention relates to a method and system for controlling use of digitally encoded products.

Digitally encoded products, such as software programs, can be perfectly reproduced in an infinite number of copies. However, unauthorized copying of programs generally involves infringement of intellectual property rights of their publishers. For this reason, it is of the utmost importance to verify compliance of the employed programs with corresponding authorized conditions of use. This problem is particularly acute in big organisations having a large number of computers, and it has been exacerbated in the last years by the widespread diffusion of the INTERNET, which further facilitates the uncontrolled distribution of this kind of products.

The above-mentioned verification is usually performed auditing all the computers manually. However, this procedure is time consuming (particularly in large sites), and prone to errors.

Some automatic tools have been also proposed for evaluating compliance of the programs with their authorized conditions of use. Typically, these tools exploit an agent installed on each computer. The agent periodically checks the programs running on the computer. The result of the verification is logged, in order to generate program usage reports. Moreover, if a program is running violating its authorized conditions of use the tool may kill the respective process (so as to stop execution of the program), and may make the program unable to start again.

However, the solution described above does not monitor usage of the programs in real-time, so that it is not possible to perform an actual licensing validation. In addition, when execution of a program is killed to enforce compliance with its authorized conditions of use, damage to the corresponding data may be suffered; this also forces an end-user to re-install the program on the computer for a next (authorized) usage.

A different solution proposed in the art, known as technical licensing, consists of modifying each program to include a call to a licensing management system. Every time the end-user starts the program a corresponding request is transferred to the licensing management system. The licensing management system verifies whether the running of the program falls within the limits set out by the authorized conditions of use embedded in a respective digital certificate, and provides a corresponding return code to the program. If the result of the verification is positive the program can continue its execution; otherwise, the program is forced to stop.

However, the solution described above requires each program to be modified by the publisher. In addition, it is quite rigid and cannot be readily adapted to different requirements. The technical licensing technology applies only to programs supporting the licensing management system, and it is completely ineffective to control usage of different products.

It is an object of the present invention to overcome the above-mentioned drawbacks. In order to achieve this object, a method as set out in the first claim is proposed.

Briefly, the present invention provides a computer-implemented method of controlling use of digitally encoded products including the steps of: requesting execution of a digitally encoded product on a computer, intercepting the execution request before starting of the product, verifying compliance of the execution request with authorized conditions of use of the product, and enabling or preventing starting of the product according to the result of the verification.

Moreover, the present invention also provides a computer program application for performing the method, a program product storing the application, and a corresponding data processing system for controlling use of digitally encoded products.

Further features and the advantages of the solution according to the present invention will be made clear by the following description of a preferred embodiment thereof, given purely by way of a non-restrictive indication, with reference to the attached figures, in which.

Figure 1:
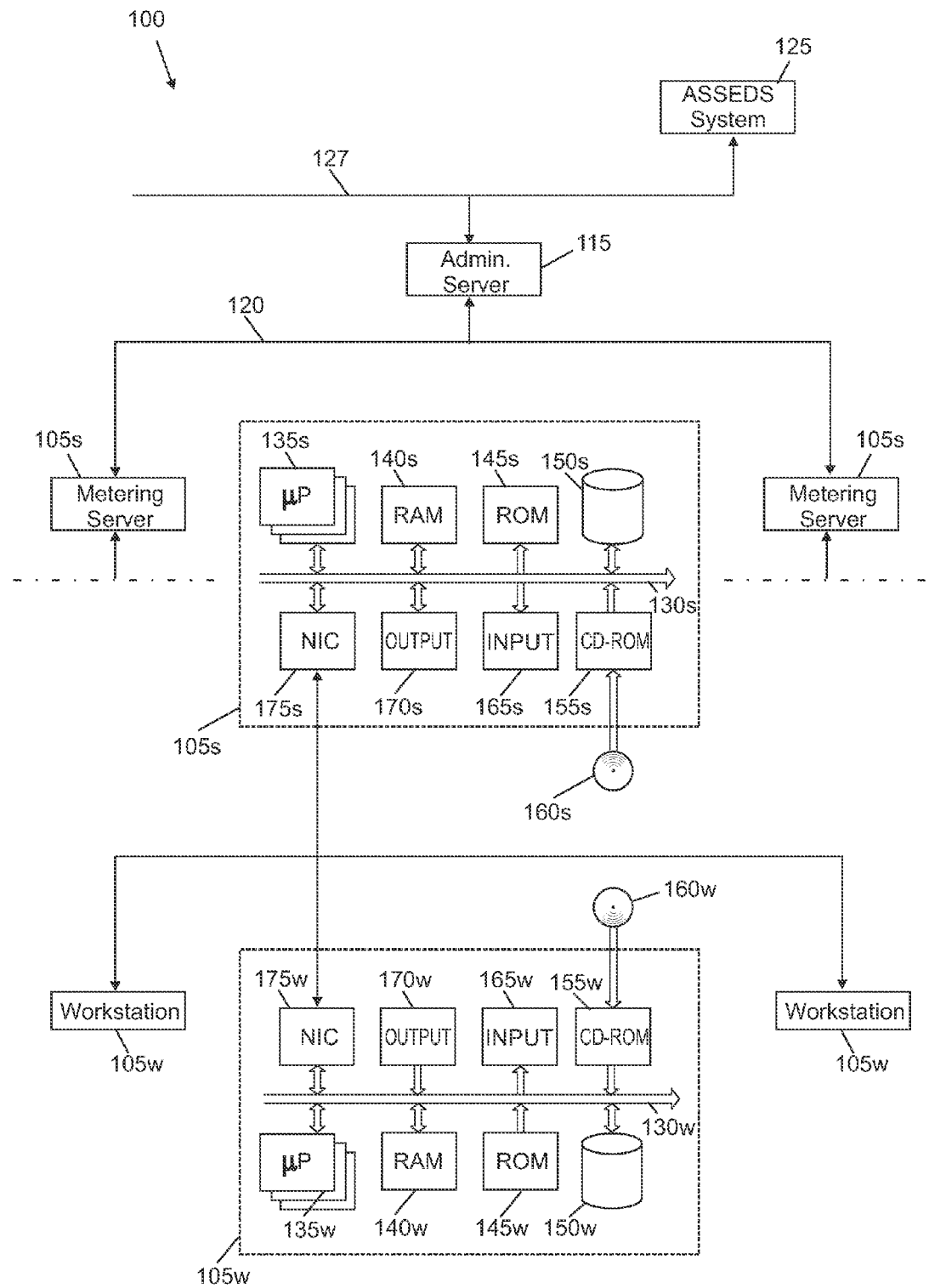
FIG. 1 is a basic block diagram of a data processing system in which the method of the invention can be used.

With reference in particular to FIG. 1, a data processing system 100 in which the method of the invention can be used is depicted. The system 100 includes multiple workstations 105w. The workstations 105w are grouped into a series of sub-sets; a metering server 105s is associated with the workstations 105w of each sub-set. The metering server 105s and the corresponding workstations 105w are connected to each other through a network 110 (for example an INTRANET). The different metering servers 105s communicate with an administrative server 115 (installed at a remote location) through a different network 120 (for example the INTERNET). Moreover, the administrative server 115 is connected to an assets management system 125 (through a further network 127), which stores information relating to the workstations and their users.

Each workstation 105w, for example consisting of a Personal Computer (PC), is formed by several units that are connected in parallel to a communication bus 130w. In detail, a microprocessor (µP) 135w controls operation of the workstation 105w, a RAM 140w is directly used as a working memory by the microprocessor 135w, and a ROM 145w stores basic programs for a bootstrap of the workstation 105w. Several peripheral units are further connected to the bus 130w (by means of respective interfaces). Particularly, a bulk memory consists of a magnetic hard-disk 150w and a driver 155w for reading CD-ROMs 160w. Moreover, the workstation 105w includes input devices 165w (for example consisting of a keyboard and a mouse), and output devices 170w (for example consisting of a monitor and a printer). A Network Interface Card (NIC) 175w is used to plug the workstation 105w into the network 110.

The metering server 105s (for example consisting of a mid-range computer) is likewise formed by a bus 130s, multiple microprocessors 135s, a RAM 140s, and a ROM 145s; the metering server 105s further includes a hard-disk 150s, a driver 155s for CD-ROMs 160s, input devices 165s, output devices 170s, and a NIC 175s (for accessing the networks 110 and 120).

Similar considerations apply if the system has a different architecture, if the workstations, the metering servers and the administrative server are connected to each other in a different manner, if other networks are employed, if each workstation or metering server has a different structure or includes different components, if no assets management system is provided, and the like.

Figure 2:
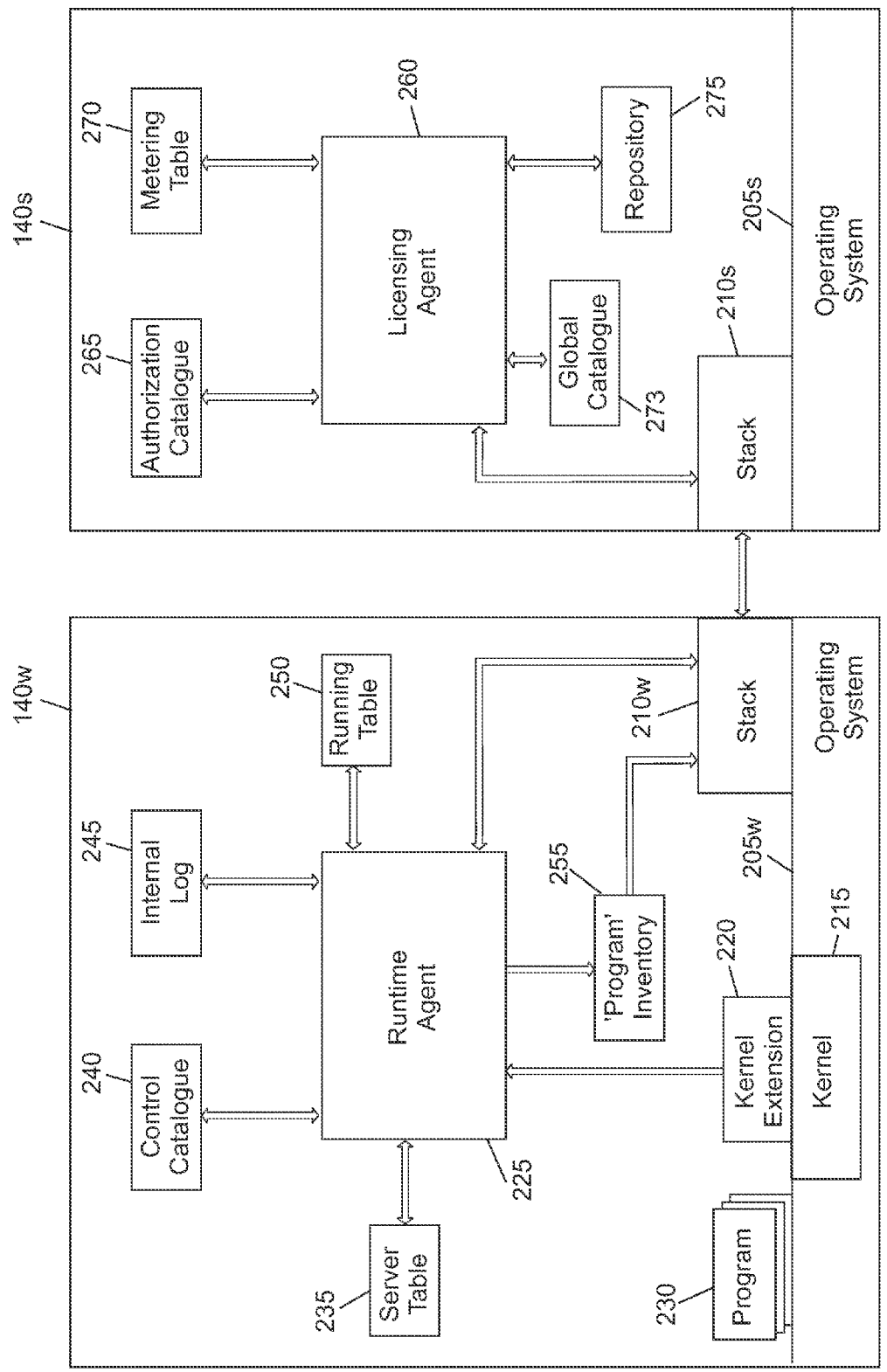
FIG. 2 shows a partial content of a working memory of a workstation and of a metering server included in the system.

Considering now FIG. 2, a partial content of the working memories 140w and 140s of the workstation and of the metering server, respectively, is shown. The information (programs and data) is typically stored on the respective hard-disks and loaded (at least partially) into the working memories when the programs are running; the programs are initially installed onto the hard disks from CD-ROMs.

An operating system $205w$ and an operating system $205s$ provide a software platform for the workstation and the metering server, respectively. A stack $210w$ (on the workstation) and a stack $210s$ (on the metering server) process a set of protocol layers working together for defining network communications. In order to ensure effective transmission of information across the INTERNET, the information is encrypted (so as to ensure security), and it is transmitted using protocols (such as the HTTP) able to cross firewalls.

Considering in particular the workstation, the operating system $205w$ includes a main module 215 (known as kernel), which provides all the essential services required by other parts of the operating system. A kernel extension module 220 adds functionality to the operating system, using publicly available, standard interfaces.

A runtime agent 225 is running in the background, for controlling execution of application programs 230 on the workstation. The runtime agent 225 interfaces with the stack $210w$, in order to exchange information with the metering servers. The runtime agent is silently installed on the workstation during a registration process, in which an end-user of the workstation registers himself/herself by connecting to a web page hosted on the associated metering server.

The runtime agent 225 controls several memory structures. Particularly, a server table 235 includes the IP addresses of possible alternative metering servers associated with the workstation (in addition to the main one directly connected to the workstation, and identified in a configuration table of the runtime agent). A control catalogue 240 lists the programs whose execution on the workstation must be controlled; on the other hand, an internal log 245 lists the programs not included in the control catalogue 240, but which have been nevertheless executed on the workstation. Moreover, the runtime agent 225 controls entering of information into a running table 250; the running table 250 lists the programs currently in execution on the workstation and for which a corresponding authorization to run has been granted (together with an identifier of the metering server that has granted the authorization). The runtime agent 225 also generates a program inventory 255 (for transmission to the metering server), which includes information about the programs installed on the workstation.

Moving now to the metering server, a licensing agent 260 running in the background controls the associated workstations. The licensing agent 260 interfaces with the stack $210s$, in order to exchange information with the workstations and the administrative server.

The licensing agent 260 manages an authorization catalogue 265, which contains information about the authorized conditions of use of each program; for example, the authorization catalogue 265 specifies the maximum processing power or the maximum capacity of the working memory of the workstations on which the program can run, the number of licenses for the program (defining the maximum number of instances of the program allowed to run concurrently), and the like. In addition, the licensing agent controls entering of information into a metering table 270, which lists the programs currently in execution on the workstations, and whose authorization to run has been granted by the metering server. The licensing agent 260 also manages a global catalogue 273 including known programs that could be generally allowed to run on the associated workstations.

Moreover, the licensing agent 260 manages a repository 275 that contains different information to be distributed to the associated workstations (such as the up-to-date version of the runtime agent code, or the list of the alternative metering servers and of the programs to be controlled) or collected from the workstations (such as real-time reporting of software usage and inventory information of programs installed on the workstations).

Similar considerations apply if the programs and data are structured in a different manner, if other modules or functions are provided, if the data are stored in equivalent memory structures, if different conditions of use are envisaged, if the information is transmitted using different protocols, if the licensing agent is embedded in a web server, and so on. Alternatively, the runtime agent is installed by a logon script stored on the workstation, or it is deployed by means of a software distribution system.

Figure 3A:
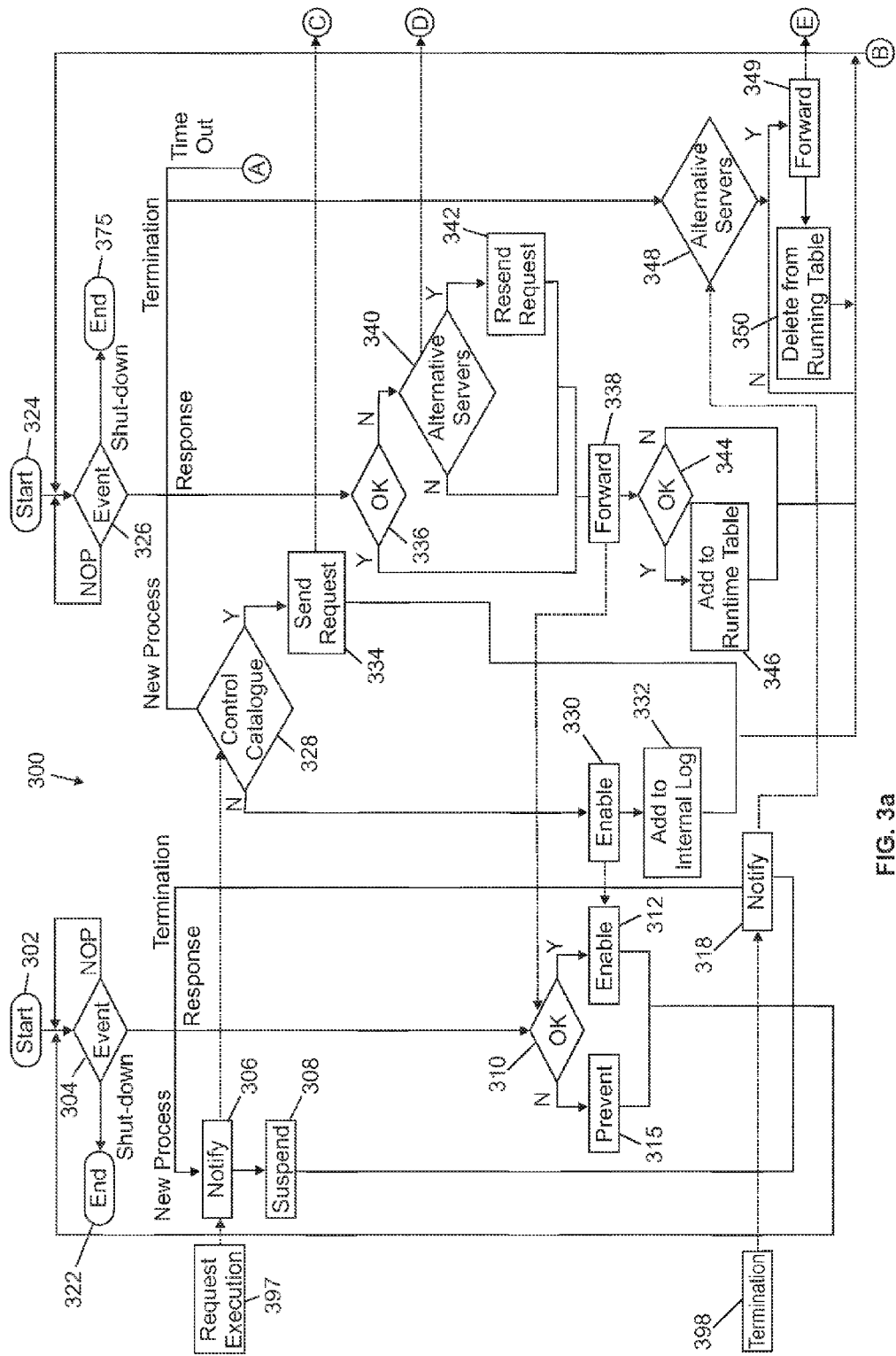
FIG. 3a-3c are a flowchart describing the logic of a method for controlling use of software programs on the workstation.
Figure 3B:
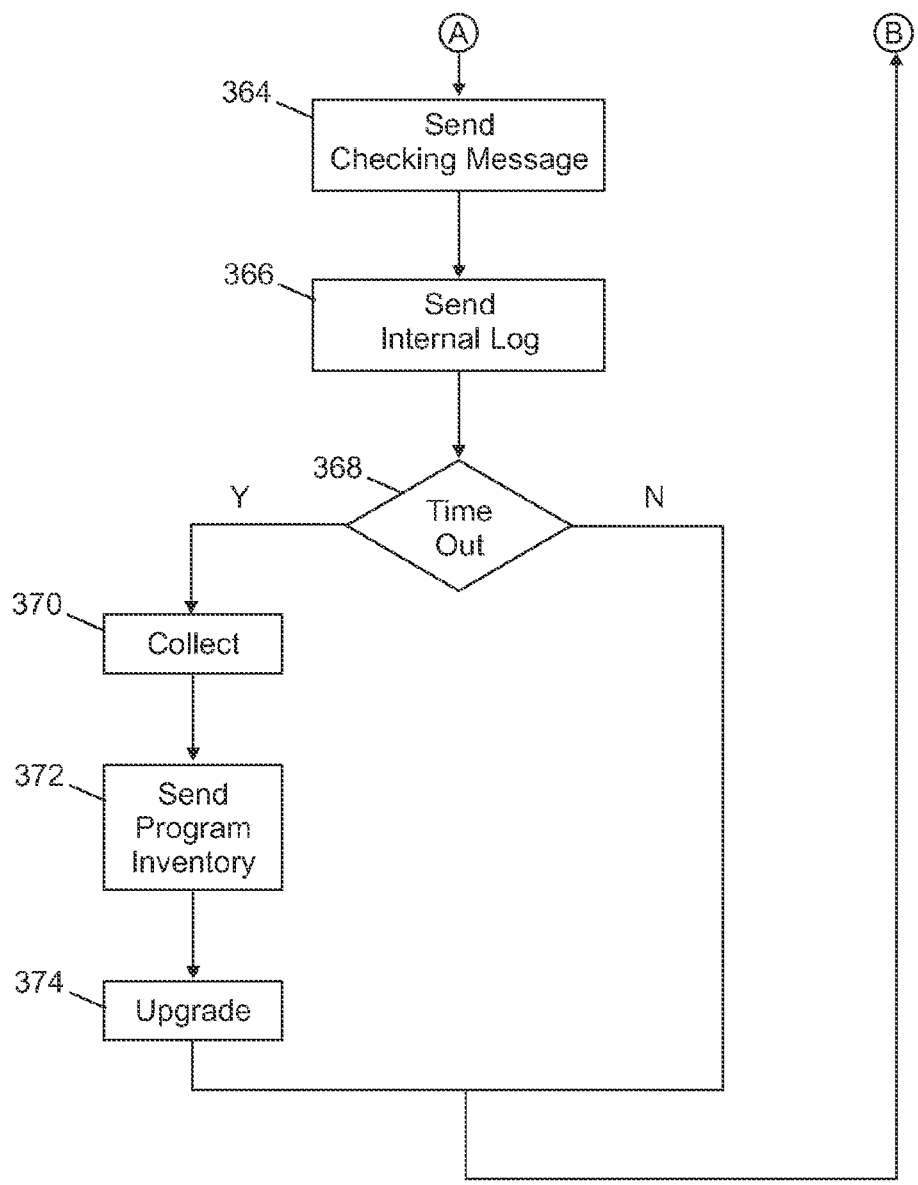
Figure 3C:
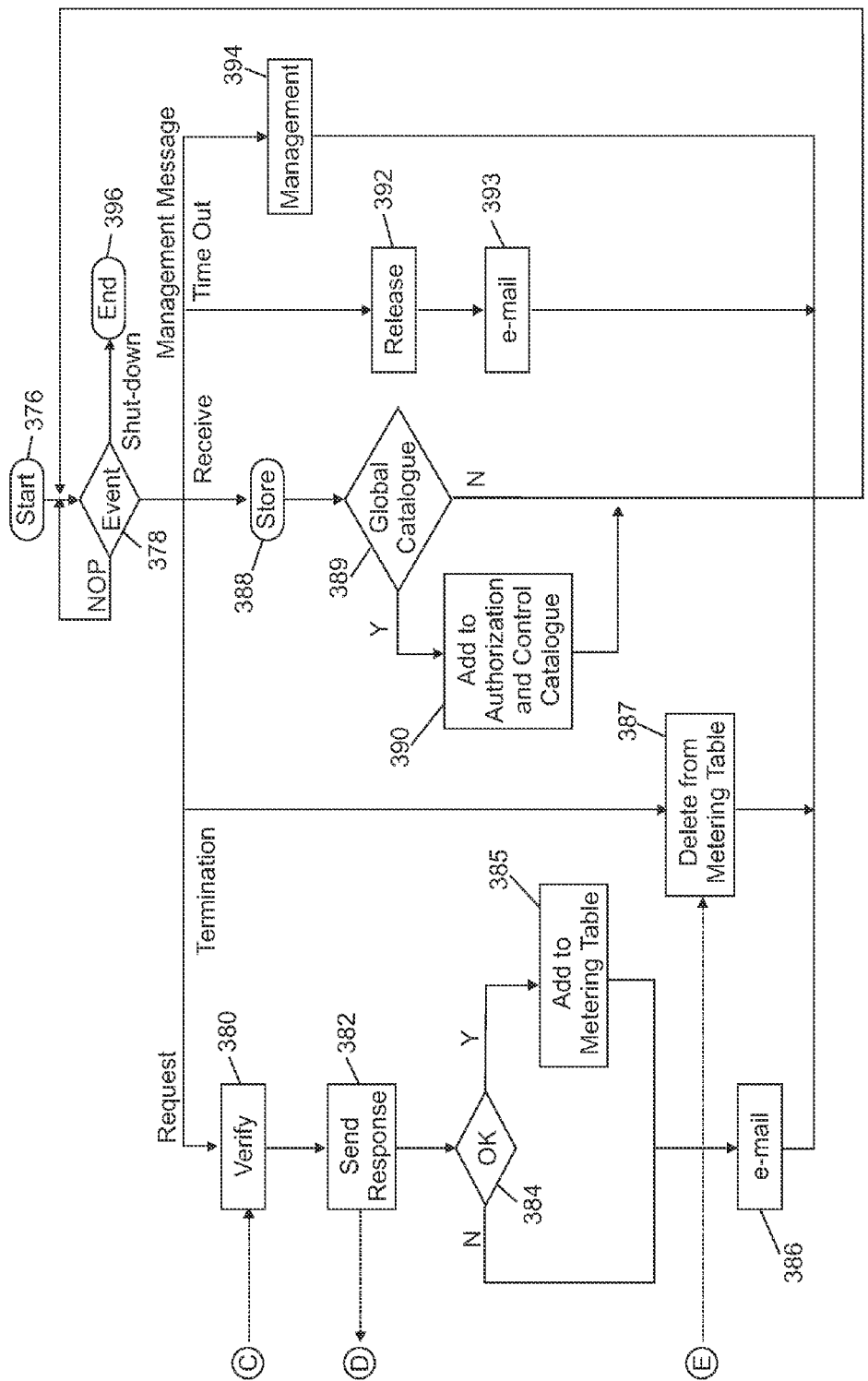

As shown in FIG. 3a-3c, a series of routines, which together make up a method 300, are performed on the workstation and the metering server for controlling use of programs installed on the workstation.

Particularly, the kernel extension module is loaded during the bootstrap of the workstation. The routine implemented by the kernel extension module starts at block 302, and then cycles in an idle loop at block 304 waiting for an event to occur. If a request of execution of a program is detected the blocks 306-308 are executed, if a corresponding response message is returned by the runtime agent the blocks 310-315 are executed, whereas if the termination of a program is detected the block 318 is executed; in every case, the routine then returns to block 304 waiting for a new event to occur. Conversely, if the workstation has been shut down, the routine ends at the final block 322.

The bootstrap of the workstation also involves the loading of the runtime agent, which implements a routine starting at block 324. The routine cycles in an idle loop at block 326 waiting for an event to occur. If an execution request is notified the blocks 328-334 are executed, if a corresponding response message is received from the metering server the blocks 336-346 are executed, if a program termination is notified the blocks 348-350 are executed, whereas if a timeout has expired the blocks 364-374 are executed; in every case, the routine then returns to block 326 waiting for a new event to occur. Conversely, if the workstation has been shut down, the routine ends at the final block 375.

At the same time, the licensing agent is loaded during the bootstrap of the metering server. The licensing agent implements a routine that starts at block 376, and then cycles in an idle loop at block 378 waiting for an event to occur. If an execution request message is received the blocks 380-386 are executed, if a termination message is received the block 387 is executed, if information is received from a workstation the blocks 388-390 are executed, if a checking message is not received from each associated workstation for a pre-set period of time the blocks 392-393 are executed, whereas if a management message is received from the administrative server the block 394 is executed; in every case, the routine then returns to block 378 waiting for a new event to occur. Conversely, if the metering server has been shut down, the routine ends at the final block 396.

Whenever the end-user requests execution of a program on the workstation (block 397), for example by double clicking with the mouse on a respective icon, the kernel starts a new process. The starting of the process is notified to the kernel extension module (using a so-called kernel hooking technique), which reports the information to the runtime agent at block 306. The kernel extension module then suspends the process at block 308.

In response to the notification, the runtime agent verifies whether the program is included in the control catalogue at block 328. If not, the method passes to block 330, wherein the runtime agent notifies the kernel extension module that the program may be started; the program is then added to the internal log at block 332. In response thereto, the kernel extension module resumes the process associated with the program at block 312, in order to enable the program to start its execution. Conversely, if the program is included in the control catalogue the runtime agent sends a corresponding execution request message to the metering server at block 334 (including configuration information defining the When the licensing agent running on the metering server receives the execution request message, it verifies at block 380 whether execution of the program would comply with the authorized conditions of use stored in the authorization catalogue (for example whether the execution environment meets the authorized one and the number of instances of the program already running does not reach the maximum value allowed). The licensing agent returns a corresponding response message to the workstation at block 382. A test is then performed at block 384 to determine whether the authorization to run has been granted. If so, the licensing agent adds the program to the metering table at block 385, and then passes to block 386; conversely, the method descends into block 386 directly. Considering now block 386, the metering server sends an e-mail of notification to a system administrator when a pre-set percentage (such as 80%) of the available licenses for the product have been granted, and a further e-mail of notification when the metering server has run out of licenses for the product.

As soon as the runtime agent receives the response message, a test is made at block 336 to determine whether the authorization to run has been granted. If so, the method descends into block 338 (described in the following). On the contrary, the runtime agent verifies at block 340 whether alternative metering servers are listed in the server table. If one or more alternative metering servers are available, the runtime agent sends the execution request message to each alternative metering server in turn, so as to perform the same verification described above; the method then descends into block 338. Conversely, if no alternative metering server is available the method proceeds to block 338 directly.

Considering now block 338, the runtime agent forwards the response message to the kernel extension module and then passes to decision block 344. If the authorization to run has been granted, the program is added to the running table at block 346 (conversely, the method returns to block 326 directly).

As soon as the kernel extension module receives the response message, a test is carried out at block 310 to determine whether the authorization to run has been granted. If so, the kernel extension module resumes the process associated with the program at block 312, in order to enable the program to start its execution; conversely, if the authorization to run has been denied the kernel extension module aborts the process at block 315, so as to prevent starting of the program.

When execution of the program is terminated (block 398), the event is notified to the kernel extension module, which reports the information to the runtime agent at block 318. In response to this notification, the runtime agent checks at block 348 whether the program is included in the running table. If so, the runtime agent sends a corresponding termination message to the metering server at block 349; passing to block 350, the program is deleted from the running table (conversely, the method returns to block 326 directly). When the licensing agent (on the metering server) receives the termination message, the program is deleted from the metering table at block 387, in order to release the respective license.

Whenever the time-out, for example of a few minutes, has expired (block 364), the runtime agent sends a checking message to each metering server that has granted an authorization to run a program on the workstation (as indicated in the running table). The method then passes to block 366, wherein the runtime agent sends the whole internal log to the associated metering server.

A test is made in decision block 368 to determine whether a longer time-out (for example of some tens of minutes) has expired. If so, the runtime agent scans the hard-disk of the workstation at block 370, in order to collect information about the programs installed thereon. Continuing to block 372, the installation information so collected (stored in the program inventory) is sent to the metering server. The runtime agent then downloads (from the metering server) any upgrade to the server table, to the control catalogue and/or to the code of the runtime agent at block 374, without requiring any user intervention.

Moving now to the licensing agent running on the metering server, any information (such as the internal log or the program inventory) received from an associated workstation is stored at block 388. When the metering server receives an internal log, the method checks at block 389 whether each program listed in the internal log is included in the global catalogue. If so, the method passes to block 390, wherein the program is added to the control catalogue to be distributed to the workstation and to the authorization catalogue (with no limit on the corresponding authorized conditions of use); in this way, any next request of execution of the program will be always enabled, so as to allow the usage of the program to be tracked for analysis by the system administrator. Conversely, the method returns to block 378 directly.

Considering now block 392, if a checking message is not received from a generic associated workstation for a pre-set period of time (for example ten minutes), all the programs running on this workstation are deleted from the metering table at block 392 (in order to release the respective licenses); a corresponding e-mail of notification is sent to the system administrator at block 393.

Moreover, whenever a management message is received from the administrative server, the corresponding actions are performed at block 394. For example, the authorization catalogue for each metering server may be extracted from a master catalogue stored on the administrative server; each authorization catalogue is then deployed to the corresponding metering server (thereby reducing the amount of information to be transferred on the network). Moreover, the administrative server may collect information from the metering server (such as about the programs installed and/or running on the corresponding workstations). The administrative server may then create different reports. In detail, the system administrator may request reports on usage of products (filtered by start and end time), on detailed usage of a specific product, on comparative views of installed, used and licensed products. Security profiles are also defined on the administrative server, so that each end-user of the workstations can only access information relating to programs he/she is using. In this way, the administrative server implements a single repository where usage, procurement and inventory data are collected and managed.

Similar considerations apply if an equivalent method is performed (for example with several concurrent processes that execute the above described operations in parallel), if other functions are provided, if the execution of the program is requested by another program, if the execution request message includes different information, if the time-out values are different or may be customised by the system administrator, if equivalent checking messages are sent to the metering servers periodically (for example including the corresponding records of the running table), if no e-mail of notification is sent to the system administrator, and so on. Alternatively, the proposed method is employed to control use of equivalent digitally encoded products, such as audio and video recordings, electronic books, or multimedia works.

More generally, the present invention provides a computer-implemented method of controlling use of digitally encoded products. The method starts with the step of requesting execution of a digitally encoded product on a computer; the execution request is intercepted before starting of the product. Compliance of the execution request with authorized conditions of use of the product is verified, and starting of the product is enabled or prevented according to the result of the verification.

The solution of the invention allows programs running on the computer to be controlled in real-time. In this way, a very effective licensing validation is carried out at low cost.

Operation of the proposed method is completely safe, because the program is prevented from starting and it is not killed while already processing data and performing potentially risky operations. Moreover, the integrity of the program is not affected by the denying of the authorization, so that execution of the program may be readily enabled later on (without having to re-install its code).

The solution of the present invention provides an integrated solution for controlling use of any type of programs, either technically licensed ones and non-technically licensed ones. Therefore, even programs that do not contain any special logic for enforcing authorized conditions of use may be controlled; at the same time, the proposed method also supports existing solutions exploiting licensing management systems.

The preferred embodiment of the invention described above offers further advantages.

Particularly, the execution request is intercepted by detecting the starting of the respective process; the process is suspended, and it is then resumed or aborted later on according to the result of the verification.

This procedure is very simple, but at the same time quite effective.

Advantageously, the operating system notifies the starting of the process to the kernel extension module, which in turn reports the execution request to the runtime agent running on the workstation; at the same time, the kernel extension module suspends the process (waiting for a response to the execution request).

The provision of the kernel extension module and the runtime agent makes the implementation of the solution of the invention platform-independent, and readily portable to any kind of operating system.

In a preferred embodiment of the invention, the execution request is processed by a metering server, which controls multiple workstations associated therewith.

The proposed architecture allows a very flexible management of the licenses. For example, concurrent use of a maximum number of instances of each program on the workstations may be controlled from a single point in a very simple manner.

Advantageously, if the associated server has already granted all the available licenses, the workstation is allowed to contact alternative metering servers.

Therefore, the total number of licenses available for each product may be shared among all the workstations of the organisation (even if they are controlled by different metering servers).

However, the solution of the invention leads itself to be carried out also intercepting the execution request in a different manner (for example monitoring any end-user action), employing only the kernel extension module or the runtime agent, processing the execution request by the workstation directly (without any metering server), and even not allowing the workstations to contact any alternative metering server.

Preferably, the control catalogue lists the programs to be metered (execution of the other programs is not affected by the envisaged method).

This feature makes it possible to implement customised licensing policies by the system administrator.

The programs not included in the control catalogue are always allowed to run; however, they are added to the internal log, which is periodically sent to the metering server (for updating the authorization catalogue and the control catalogue for the workstation).

The internal logs provided by the different workstations allow usage of any new product to be readily tracked (with unlicensed programs that are reported to the metering server as soon as they are used).

Alternatively, no control catalogue is provided (with all the programs that are always controlled), the running of programs not included in the control catalogue is notified to the metering server immediately, the authorization and control catalogues are updated in a different manner according to the internal log (even without using any global catalogue), or only the programs listed in the control catalogue may be executed on the workstation (provided that they are authorized to).

In addition, when the program ends its execution a termination message is sent from the workstation to the metering server that has granted the respective authorization to run; the program is then deleted from the running table (on the workstation) and the metering table (on the metering server).

This procedure ensures direct release of the corresponding license, as soon as the program ends its execution; the license is then immediately available for use by other workstations.

Advantageously, each workstation periodically sends a checking message to the respective metering servers that have granted the authorizations to run; if the checking message from a workstation is not received for a pre-set period of time, the metering server automatically releases the licenses used by the workstation.

In this way, if a workstation cannot release a license, for example because of a network problem, the license is released automatically on the metering server.

However, the solution of the invention is also suitable to be implemented detecting the termination of each program in a different manner (for example with a polling procedure under the control of each metering server), and even without any periodic transmission of the checking message (with the licenses that are automatically released after a pre-set period of time, such as every night).

Advantageously, each workstation periodically collects installation information, which is then sent to the associated metering server.

The envisaged feature makes it possible to track and keep watch of products installed on each workstation (even if they are not used).

In a preferred embodiment of the invention, a single administrative server centrally controls multiple metering servers.

The proposed three-tier architecture (workstations, metering servers and administrative server) enables a very flexible management of the licenses from a centralised point.

For example, the administrative server collects information from all the metering servers, in order to provide historical reporting concerning program usage and inventory information for all the workstations. In addition, it provides an administrative interface to maintain licensing information from a centralised point.

Therefore, it is possible to save money by detecting over compliance conditions (wherein too many licenses are available for unused products), or it is possible to detect potential infringement conditions in advance (in order to take corrective actions before running out of licenses).

The proposed architecture features a high scalability. For example, in a small company only one metering server and one administrative server are needed (even installed on the same computer). Conversely, in a large company, multiple metering servers (controlled by a single administrative server) may be provided in one or more networks. On the other hand, the administrative server may be installed in a remote location and may control metering servers at different facilities (for example in an organisation that offers software management services to other companies).

Alternatively, the installation information is collected on request, the proposed method only controls execution of the programs (and not their installation), or the system has a different architecture (even without any administrative server).

Advantageously, the solution according to the present invention is implemented with a computer program application, which is provided on CD-ROM. The application consists of programs installed on each workstation and on the associated metering sever.

Alternatively, the programs are provided on floppy-disks, are pre-loaded onto the hard-disks, or are stored on any other computer readable medium, are sent to the workstation and the metering server through a network (typically the INTERNET), are broadcast, or more generally are provided in any other form directly loadable into their working memories. However, the method according to the present invention leads itself to be carried out even with a hardware structure, for example integrated in chips of semiconductor material.

Naturally, in order to satisfy local and specific requirements, a person skilled in the art may apply to the solution described above many modifications and alterations all of which, however, are included within the scope of protection of the invention as defined by the following claims.

The invention claimed is:

1. A data processing system for controlling use of digitally encoded products, the data processing system comprising:
 a processor;
 a computer readable medium storing instructions which, when executed by the processor, causes the processor to perform the method of:
  requesting execution of a digitally encoded product on a computer;
  intercepting the execution request before starting of execution of the product;
  determining whether the product is included in a control memory structure of the computer indicative of products to be controlled;
  responsive to determining that the product is included in the control memory structure:
   verifying compliance of the execution request with authorized conditions of use of the product, wherein verifying compliance of the execution request includes:
    sending a request message indicative of the execution request from the computer to a metering server associated with a plurality of computers;
    granting or denying an authorization to run the product by the metering server according to a comparison between licensing information indicative of the authorized conditions of use for all the associated computers and a metering memory structure indicative of the authorizations to run currently granted by the metering server;
    sending a corresponding response message from the metering server to the computer; and
    adding the product to the metering memory structure when the authorization to run has been granted; and
   enabling or preventing staffing of the product according to the result of the verification; and
  responsive to determining that the product is not included in the control memory structure:
   enabling starting of the product;
   adding an indication of the product to a log stored on the computer;
   periodically transmitting the log to the associated metering server; and
   updating the control memory structure and the licensing information according to the log.

2. A computer program product stored on a computer readable medium for controlling use of digitally encoded products, the computer program product comprising instructions for performing the method of:
 requesting execution of a digitally encoded product on a computer;
 intercepting the execution request before starting of execution of the product;
 determining whether the product is included in a control memory structure of the computer indicative of products to be controlled;
 responsive to determining that the product is included in the control memory structure:
  verifying compliance of the execution request with authorized conditions of use of the product; wherein verifying compliance of the execution request includes:
   sending a request message indicative of the execution request from the computer to a metering server associated with a plurality of computers;
   granting or denying an authorization to run the product by the metering server according to a comparison between licensing information indicative of the authorized conditions of use for all the associated computers and a metering memory structure indicative of the authorizations to run currently granted by the metering server;
   sending a corresponding response message from the metering server to the computer; and
   adding the product to the metering memory structure when the authorization to run has been granted; and
  enabling or preventing staffing of execution of the product according to the result of the verification; and
 responsive to determining that the product is not included in the control memory structure:
  enabling starting of the product;

adding an indication of the product to a log stored on the computer;
periodically transmitting the log to the associated metering server; and updating control memory structure and the licensing information according to the log.

\* \* \* \* \*